(12) United States Patent
Graves

(10) Patent No.: US 7,289,736 B1
(45) Date of Patent: Oct. 30, 2007

(54) ADAPTIVE OPTICS IMAGING SYSTEM WITH OBJECT ACQUISITION CAPABILITY

(75) Inventor: J. Elon Graves, Los Gatos, CA (US)

(73) Assignee: AOptix Technologies, Campbell, CA (US)

( * ) Notice: Subject to any disclaimer, the term of this patent is extended or adjusted under 35 U.S.C. 154(b) by 745 days.

(21) Appl. No.: 10/756,174

(22) Filed: Jan. 12, 2004

Related U.S. Application Data

(60) Provisional application No. 60/439,846, filed on Jan. 13, 2003.

(51) Int. Cl.
   *H04B 10/00* (2006.01)

(52) U.S. Cl. .................. 398/119; 398/122; 398/123

(58) Field of Classification Search ......... 398/118–125
   See application file for complete search history.

(56) References Cited

U.S. PATENT DOCUMENTS

| | | | |
|---|---|---|---|
| 4,128,309 A | 12/1978 | Lehureau et al. | |
| 4,271,355 A * | 6/1981 | Wisner et al. | ........... 250/201.9 |
| 4,588,268 A | 5/1986 | Aldrich | |
| 4,949,056 A | 8/1990 | Akkapeddi | |
| 5,051,571 A | 9/1991 | Brown et al. | |
| 5,204,847 A | 4/1993 | Tayefeh | |
| 5,229,889 A | 7/1993 | Kittell | |
| 5,594,580 A | 1/1997 | Sakanaka et al. | |
| 5,777,719 A | 7/1998 | Williams et al. | |
| 5,872,644 A | 2/1999 | Yamazaki et al. | |
| 5,907,153 A | 5/1999 | Gouch | |
| 5,949,521 A | 9/1999 | Williams et al. | |
| 5,978,121 A | 11/1999 | Fischer et al. | |
| 6,016,212 A | 1/2000 | Durant et al. | |
| 6,181,450 B1 | 1/2001 | Dishman et al. | |
| 6,239,888 B1 | 5/2001 | Willebrand | |
| 6,278,100 B1 * | 8/2001 | Friedman et al. | ........ 250/201.9 |
| 6,384,944 B1 | 5/2002 | Takayama et al. | |
| 6,452,145 B1 | 9/2002 | Graves et al. | |
| 6,464,364 B2 | 10/2002 | Graves et al. | |
| 6,721,510 B2 | 4/2004 | Graves et al. | |
| 2004/0141752 A1* | 7/2004 | Shelton et al. | ............ 398/120 |

FOREIGN PATENT DOCUMENTS

WO    WO 01/52450 A2    7/2001

OTHER PUBLICATIONS

Graves, J. Elon et al., "First Light for Hokupa'a: 36 Element Curvature AO System at UH," Proceedings of SPIE vol. 3353, Mar. 1998, pp. 34-43.

Graves, J.E. et al., "Latest Results from the University of Hawaii Prototype Adaptive Optics System," Univ. Hawaii Laser Guide Star Adaptive Optics Workshop: Proceedings—vol. 1, Mar. 10-12, 1992, pp. 511-521.

(Continued)

*Primary Examiner*—Dalzid Singh
(74) *Attorney, Agent, or Firm*—Fenwick & West LLP

(57) ABSTRACT

An adaptive optics imaging system has an acquisition imaging subsystem to assist in initial acquisition and alignment of the system to a target object. A wavefront sensor in the adaptive optics imaging system is aligned to a reference object in the acquisition imaging subsystem. The target object is also aligned to the reference object. In this way, alignment of the target object with the wavefront sensor is achieved.

33 Claims, 5 Drawing Sheets

OTHER PUBLICATIONS

Press Release: "LightPointe Granted New Free-Space Optics (FSO) Patent, Strengthens Intellectual Property on All-Optical FSO Systems," San Diego, CA, Oct. 17, 2002, 1 page.

Roddier, C. et al., "New optical testing methods developed at the University of Hawaii; results of ground-based telescopes and hubble space telescope," SPIE, vol. 1531, *Advanced Optical Manufacturing and Testing II* (1991), pp. 37-43.

Roddier, Francois et al., "A Simple Low-Order Adaptive Optics System for Near-Infrared Applications," Publications of the Astronomical Society of the Pacific, vol. 103, No. 659, Jan. 1991, pp. 131-149.

Roddier, Francois, "Astronomical adaptive optics with natural reference stars," University of Hawaii, Institute for Astronomy, 2680 Woodlawn Drive, Honolulu, Hawaii 96822, pp. 19-23.

Roddier, Francois, "Curvature sensing and compensation: a new concept in adaptive optics," *Applied Optics*, vol. 27, No. 7, Apr. 1, 1998, pp. 1223-1225.

Roddier, Francois, "Wavefront sensing and the irradiance transport equation," *Applied Optics*, vol. 29, No. 10, Apr. 1, 1990, pp. 1402-1403.

\* cited by examiner

ADAPTIVE OPTICS IMAGING SYSTEM WITH OBJECT ACQUISITION CAPABILITY

CROSS-REFERENCE TO RELATED APPLICATION

This application claims priority under 35 U.S.C. § 119(e) to U.S. Provisional Patent Application Ser. No. 60/439,846, "Adaptive Optics Imaging System with Object Acquisition Capability," filed Jan. 13, 2003. The subject matter of the foregoing is incorporated herein by reference in its entirety.

BACKGROUND OF THE INVENTION

1. Field of the Invention

This invention relates generally to adaptive optics systems and, more particularly, to object acquisition and alignment of adaptive optics systems.

2. Description of the Related Art

With recent advances in technology, there is an increasing interest in the use of adaptive optics for various applications. For example, there is a rapidly expanding need for data transmission and an infrastructure to accomplish it. While the use of fiber optics has increased the capacity and efficiency of data transmission, the expanding data transmission needs require continual additions to the fiber optics infrastructure at enormous expense and difficulty. There have been experiments and attempts to augment the data transmission system by using light waves through the free-space of the atmosphere. However, the inevitable changes in atmospheric conditions are a significant impediment to the accuracy and reliability of free space optical data transmission systems. For example, atmospheric conditions such as wind, heat waves and the like create aberrations that are constantly changing. This, in turn, degrades the quality of the wavefront that is received, resulting in degradation of the overall quality of the data transmission. There is an increasing interest to use adaptive optics to correct for these aberrations, thus improving the performance and reliability of free space optical data transmission systems.

However, for certain applications, it can be difficult to align the adaptive optics system. For example, in data transmission applications, it is usually desirable for the transmitter to generate a narrow optical beam in order to increase the power efficiency of the system. The receiver optics typically also has a narrow field of view in order to avoid receiving unnecessary background noise and undesirable artifacts. However, it is generally difficult to align a receiver with a narrow field of view to a transmitted beam which is also narrow in beam width.

Increasing the width of the transmitted optical beam and/or the field of view of the receiver optics can reduce this difficulty. However, both of these solutions have significant drawbacks. As mentioned above, increasing the width of the transmitted optical beam means that a greater percentage of the beam will not be collected by the receiver optics and will be wasted, lowering the overall efficiency of the system. In addition, if multiple receivers are located close to one another, a transmitted optical beam that is wider than the collection aperture of the receiver optics may spill over to adjacent receivers, interfering with their proper operation. Increasing the field of view of the receiver optics also has its drawbacks. In addition to collecting more background noise, increasing the field of view increases the chances that auto-tracking receivers will track the wrong object. Adaptive optics systems typically run in closed loop mode where they automatically correct for the aberrations experienced by an object—the transmitted optical beam in this example. However, systems may sometimes begin to track the wrong object, for example the sun, glints, or other bright objects that appear within the system's field of view. Increasing the field of view increases the risk that this might happen.

Thus, there is a need for adaptive optics imaging systems that have improved acquisition and alignment capability.

SUMMARY OF THE INVENTION

The present invention overcomes the limitations of the prior art by providing an adaptive optics imaging system that has an acquisition imaging subsystem to assist in acquisition and alignment of the system to a target object. A wavefront sensor in the adaptive optics imaging system is aligned to a reference object in the acquisition imaging subsystem. The target object is also aligned to the reference object. In this way, alignment of the target object with the wavefront sensor is achieved.

In one implementation, the adaptive optics imaging system includes a primary imaging subsystem and an acquisition imaging subsystem, which are located in fixed positions relative to each other. The primary imaging subsystem includes a telescope. It also includes a variable phase device and a wavefront sensor located on the optical axis of the telescope. These two elements provide adaptive optics capability. The acquisition imaging subsystem includes an optical imager, which images a reference object onto an acquisition detector. A beamsplitter combines the primary imaging subsystem and the acquisition imaging subsystem. The beamsplitter splits the optical axis of the optical imager so that the wavefront sensor preferably is located at an image plane of the optical imager. The optical axis of the telescope is split upstream of the variable phase device and so that the acquisition detector preferably is located at an image plane of the telescope. Typically, the field of view of the acquisition detector is larger than the field of view of the wavefront sensor.

The variable phase device is controlled to align the wavefront sensor and the reference object. In one implementation, the reference object is incident upon the wavefront sensor and signals from the wavefront sensor are used to control the variable phase device. A beam steering mechanism for the telescope is controlled to align the target object for the telescope with the reference object. In one implementation, both the target object and the reference object are imaged onto the acquisition detector and are aligned by aligning their images.

In one specific implementation, the variable phase device is a deformable mirror, the wavefront sensor uses a pair of defocused pupil images, the reference object is the end of an optical fiber, the acquisition detector is a CCD imaging array, and the beam steering mechanism is a tip-tilt mirror. The overall system is used for data transmission in the 1.55 μm wavelength region and the wavefront sensor is also sensitive at this wavelength, but the CCD imaging array operates in the near infrared wavelength region. Accordingly, both a 1.55 μm source and a near infrared source are coupled into the fiber so that the reference object includes both wavelengths. The primary target object is the 1.55 μm transmitter but near infrared beacons, located in a known position relative to the primary object, are also used for the initial acquisition and alignment.

Other aspects of the invention include methods and systems corresponding to the devices described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
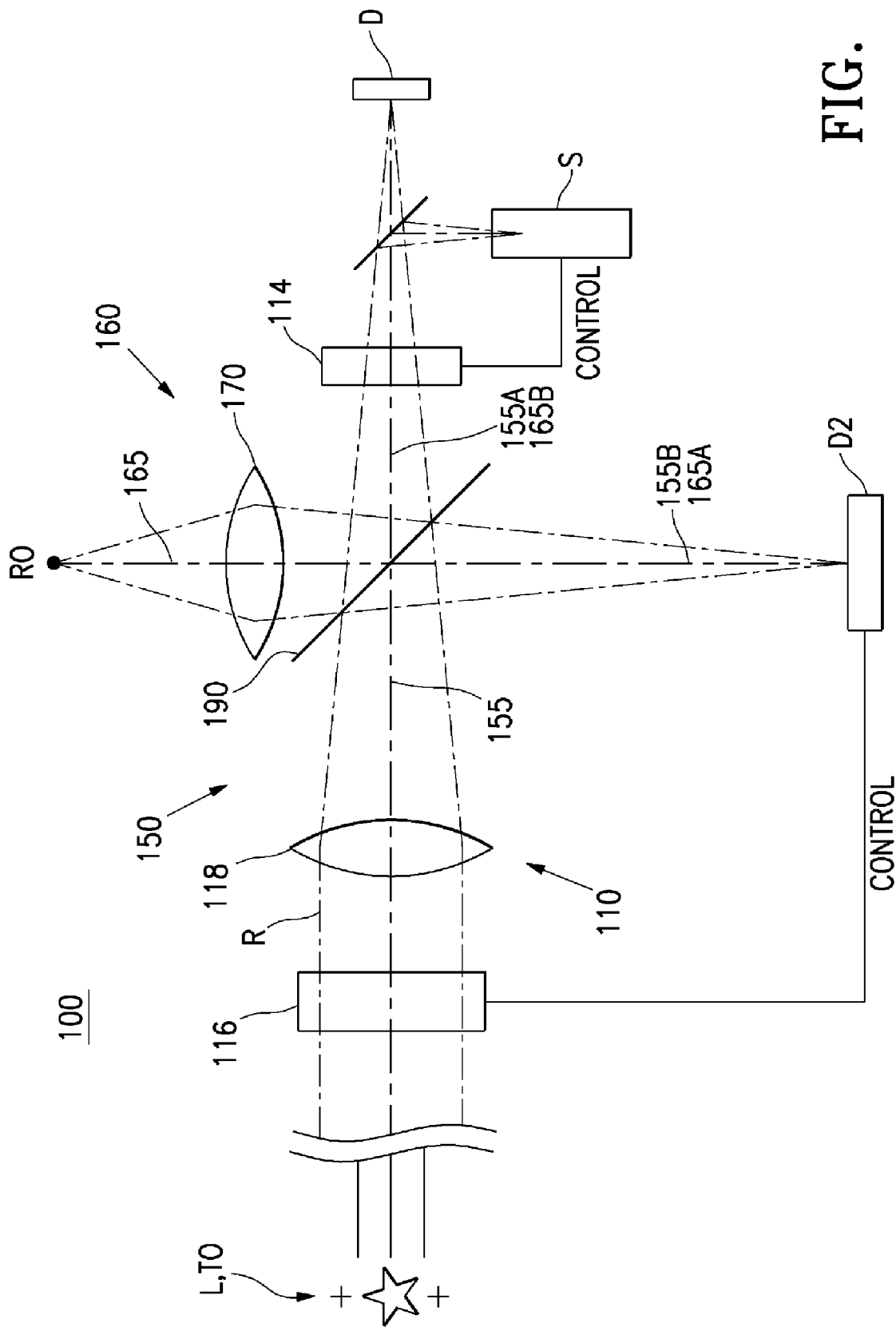
FIG. 1 is an illustration of an adaptive optics imaging system according to the present invention.

FIG. 1 is an illustration of an adaptive optics imaging system 100 according to the present invention. The system 100 includes a primary imaging subsystem 150 and an acquisition imaging subsystem 160, which are located in fixed positions relative to each other. The system 100 also include a beamsplitter 190 that combines the two imaging subsystems 150 and 160, as will be further described below.

The primary imaging subsystem 150 includes a telescope 110 (represented by lens 118 in FIG. 1), a variable phase device 114 and a wavefront sensor S. The telescope 110 has an optical axis 155. The variable phase device 114 and wavefront sensor S are located on the optical axis 155, with the wavefront sensor S downstream of the variable phase device 114. The primary imaging subsystem 150 typically also includes a detector D. In this example, a beamsplitter 126 splits the optical axis between the detector D and wavefront sensor S. The primary imaging subsystem 150 also includes a beam-steering mechanism 116.

The primary imaging subsystem 150 images light rays R from a light source L onto the detector D. The variable phase device 114 and wavefront sensor S form an adaptive optics loop that can be used to compensate for aberrations in the optical path traveled by the light rays R. The variable phase device 114 introduces an adjustable phase that ideally would reverse the effects of unwanted aberrations, leaving zero residual aberration. Examples of variable phase devices 114 include deformable mirrors (which operate in reflection) and liquid crystal devices (which can operate in transmission). The wavefront sensor S takes a measure of the actual amount of residual aberration and the variable phase device 114 is controlled accordingly.

During normal operation, the adaptive optics feedback loop operates as described above. However, in order for this to work well, the light source L is assumed to be within the field of view of the wavefront sensor S. In other words, it is assumed that the telescope 110 has already acquired the light source L. This is not always a trivial task. For various reasons, the field of view of the wavefront sensor S may be fairly narrow. For example, if the primary imaging subsystem 150 is actively tracking the light source L, a narrow field of view reduces the risk that some other bright object (e.g., the sun) will confuse the subsystem 150 into tracking it instead.

Accordingly, the acquisition imaging subsystem 160 assists in the acquisition of the light source L. The acquisition imaging subsystem 160 includes an optical imager 170 (represented by a lens in FIG. 1), a reference object RO and an acquisition detector D2. The optical imager 170 images the reference object RO onto the detector D2. The optical imager 170 also includes an optical axis 165.

Beamsplitter 190 "combines" the two imaging subsystems 150 and 160. With respect to the primary imaging subsystem, the beamsplitter 190 is located upstream from the variable phase device 114. Downstream of the beamsplitter 190, the optical axis 155 of the telescope is split into two parts: 155A and 155B. In branch 155A, the optical axis continues on to the variable phase device 114 and wavefront sensor S, as before. The other branch 155B is aligned so that the acquisition detector D2 lies in an image plane of the telescope 110. The beamsplitter 190 also splits the optical axis 165 of the acquisition imaging subsystem 160 into two parts: 165A and 165B. One branch 165A continues to the acquisition detector D2 as before. The other branch 165B is aligned so that the wavefront sensor S is located at an image plane of the optical imager 170. Since the beamsplitter 190 overlaps the two imaging subsystems 150 and 160, the overall system can be designed so that the subsystems share certain components. For example, there may be two beamsplitters rather than one, and the optical train between the beamsplitters may be common to both imaging subsystems 150 and 160.

Note that in system 100, both the light source L and the reference object RO have an optical path to the wavefront sensor S. Rays from the light source L travel via 155-155A and those from the reference object RO travel via 165-165B. In addition, both the light source L and the reference object RO have an optical path to the acquisition detector D2: the light source L via 155-155B and the reference object RO via 165-165A. Typically, the field of view of the acquisition detector D2 is larger than that of the wavefront sensor S. This aids in the initial acquisition of light source L since the acquisition detector D2 will "see" the light source L before it comes into the field of view of the wavefront sensor S.

Figure 2:
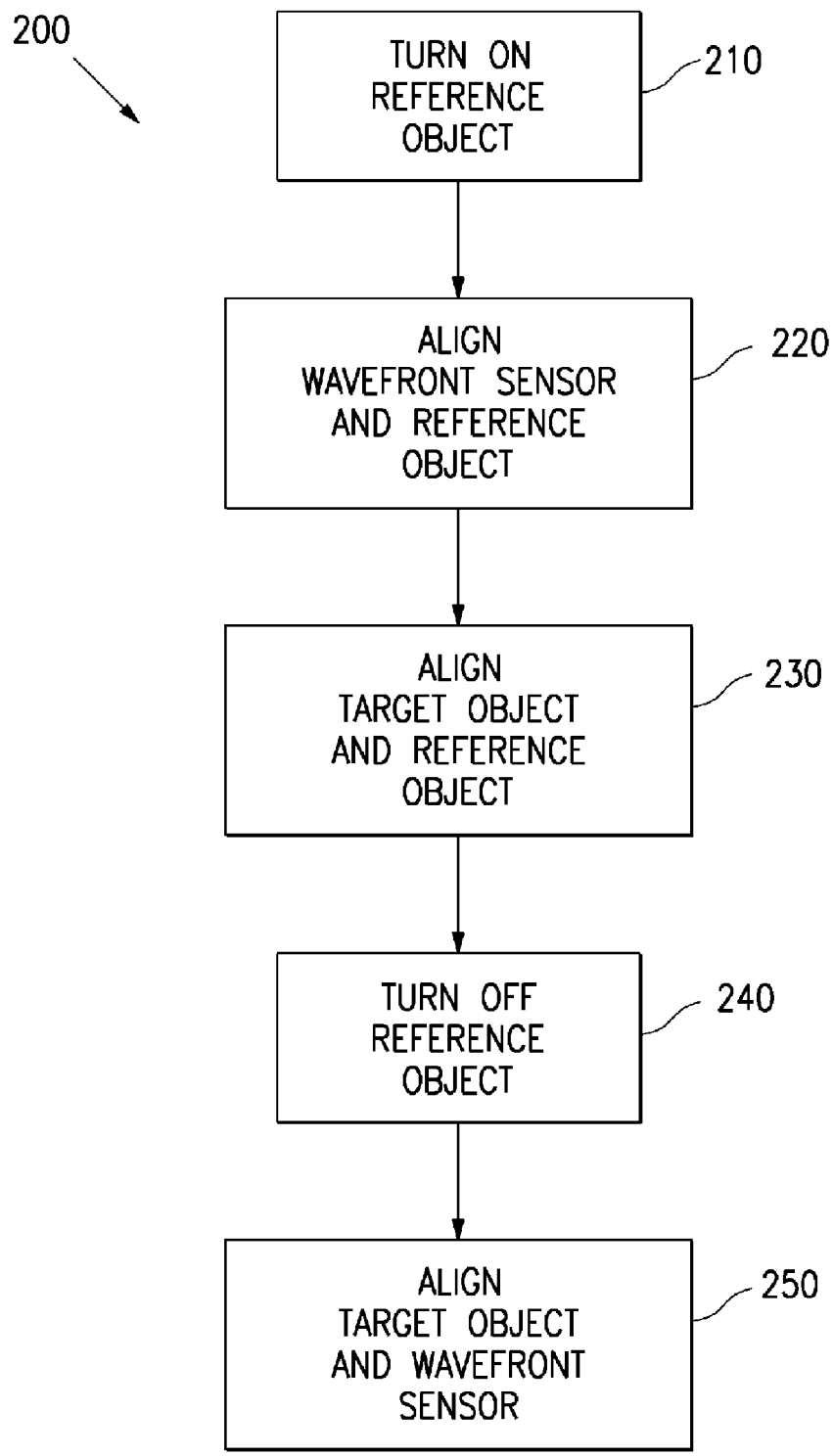
FIG. 2 is a flow diagram illustrating object acquisition for an adaptive optics imaging system.
Figure 3A:
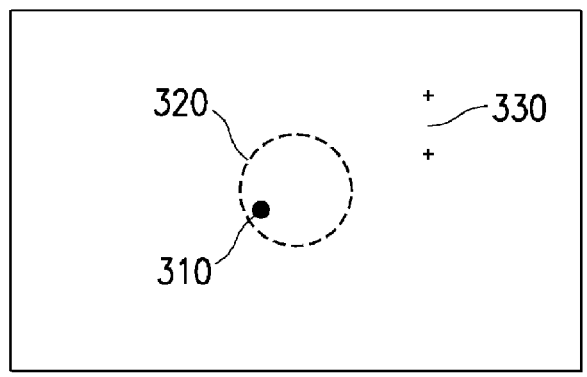
FIGS. 3A-3C are illustrations of the field of view of the acquisition detector, illustrating object acquisition.
Figure 3B:
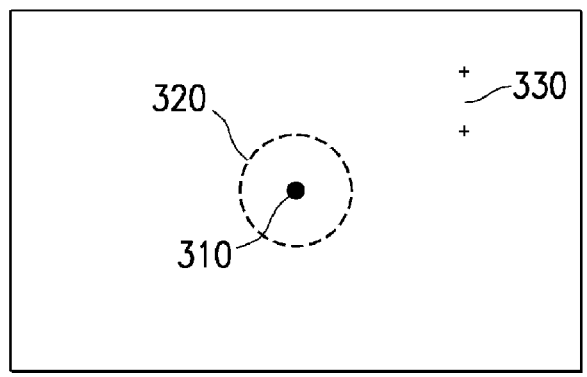
Figure 3C:
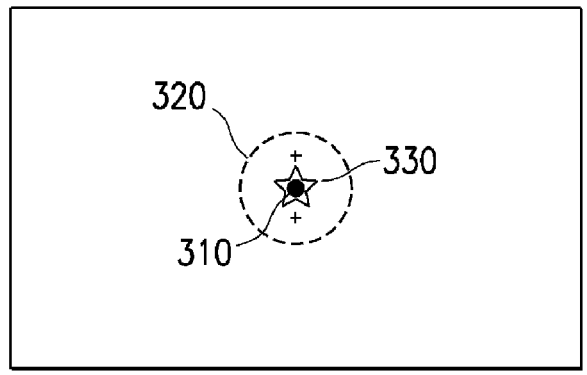

FIG. 2 is a flow diagram illustrating one method 200 of object acquisition by the adaptive optics imaging system 100. FIGS. 3A-3C are illustrations of the field of view of the acquisition detector D2 during this initial acquisition. The following explanation uses the term "target object TO" rather than "light source L" because the object that is initially acquired by the system 100 may not be the same as the light source L. For example, the light source L may be surrounded by beacon lights and it may be the beacons that are initially acquired. In this case, the target object TO includes both the beacons and the light source L. The light source L is the primary object to be acquired and the beacons aid in the acquisition.

Referring to FIG. 2, method 200 begins by turning on 210 the reference object RO. In this example, the reference object RO is depicted as a point source although it is not required to be a point source. The reference object RO is imaged by optical imager 170 onto the acquisition detector D2, which in this example is an imaging array. FIG. 3A is a representation of the imaging array D2. The image of the reference object is shown by the dot 310. Also shown are a dashed circle 320, which represents the field of view of the wavefront sensor S, and two crosses 330, which represent the image of the target object TO. Circle 320 is dashed because, in the geometry of FIG. 1, the circle 320 does not represent an actual image of the wavefront sensor S on the acquisition detector D2. Rather, it represents a projection of the field of view of the wavefront sensor S onto the acquisition detector D2. In the initial state of FIG. 3A, the reference object 310, wavefront sensor 320 and target object

330 are misaligned. Note that the target object 330 is outside the field of view of the wavefront sensor 320.

In step 220, the wavefront sensor 320 is aligned to the reference object 310. In FIG. 3A, the reference object 310 is within the field of view of the wavefront sensor 320. This can be achieved by an initial manual alignment of the two subsystems 150 and 160 and beamsplitter 190. Since the reference object RO falls within the wavefront sensor S's field of view, the wavefront sensor detects the wavefront generated by the reference object RO. Misalignment, as shown in FIG. 3A, is manifested as a wedge (i.e., tilt) error in the wavefront. A controller adjusts the variable phase device 114 to remove this error, thus adjusting the optical path 165B and aligning the wavefront sensor 320 to the reference object 310, as shown in FIG. 3B.

In step 230, target object 330 is aligned to the reference object 310 as follows. The target object TO produces an image 330 on the acquisition detector D2. The reference object RO also produces an image 310. A controller determines the relative location of the two images and controls the beam-steering mechanism 116 in the telescope 110 so as to move the target object 330 into alignment with the reference object 310, as shown in FIG. 3C. Examples of beam-steering mechanisms 116 include adjustable mirrors (or other optics) and mechanical gimbals. At this point, the target object 330 is aligned with the reference object 310, and the wavefront sensor 320 is aligned with the reference object 310. Therefore, the target object 330 is also aligned with the wavefront sensor 320. In FIG. 3C, the star portion of the target object 330 is also shown to illustrate this alignment.

The reference object RO can be turned off 240. Since the target object 330 is within the wavefront sensor S's field of view, the adaptive optics control loop can take over. It completes fine alignment 250 of the target object and the wavefront sensor and maintains the alignment.

FIGS. 1-3 are examples. Many variations are possible. For example, steps 220 and 230 can occur in different orders: step 220 first, step 230 first, or both steps simultaneously. As another example, it is not necessary to turn the reference object RO on 210 and off 240. In some implementations, it may remain on constantly. As another example, "aligning" does not necessarily mean "centering." If the two crosses of the target object TO were to the left of the light source L, then the image 330 of the two crosses ideally would be offset to one side of the wavefront sensor 320 so that the light source L is within the wavefront sensor S's field of view.

The reference object RO and target object TO can also take many different forms. The reference object RO can take a shape other than a point source, although it preferably is a point source that is near the diffraction limit at the wavelength used by the wavefront sensor S. The reference object RO can include multiple sources with different characteristics. For example, the reference object RO is imaged onto the acquisition detector D2 and is also received by the wavefront sensor S. Accordingly, it might include two sources, one for each purpose. These sources might differ in wavelength—for example if the acquisition detector D2 and wavefront sensor S were sensitive to different wavelengths. They might also have different amplitudes or be variable in amplitude—for example if it is necessary to increase the amplitude in order for the reference object to rise above the noise for either the acquisition detector D2 or the wavefront sensor S. Adjustable amplitude can also be used to turn on the reference object RO during acquisition and to turn off the reference object RO when the system is not in acquisition mode.

Similarly, the target object TO can also take any number of shapes and/or locations relative to the light source L. Any number and type of beacon can be used as part of the target object TO. If the light source L includes optics, for example a telescope projecting a beam to system 100, beacons may or may not share the same optics. The beacon could also be projected by the telescope or could be located around the entrance aperture of the telescope (or elsewhere outside the telescope). The beacons might flash in order to better distinguish them from the background. They could also function as a separate data channel.

Figure 4:
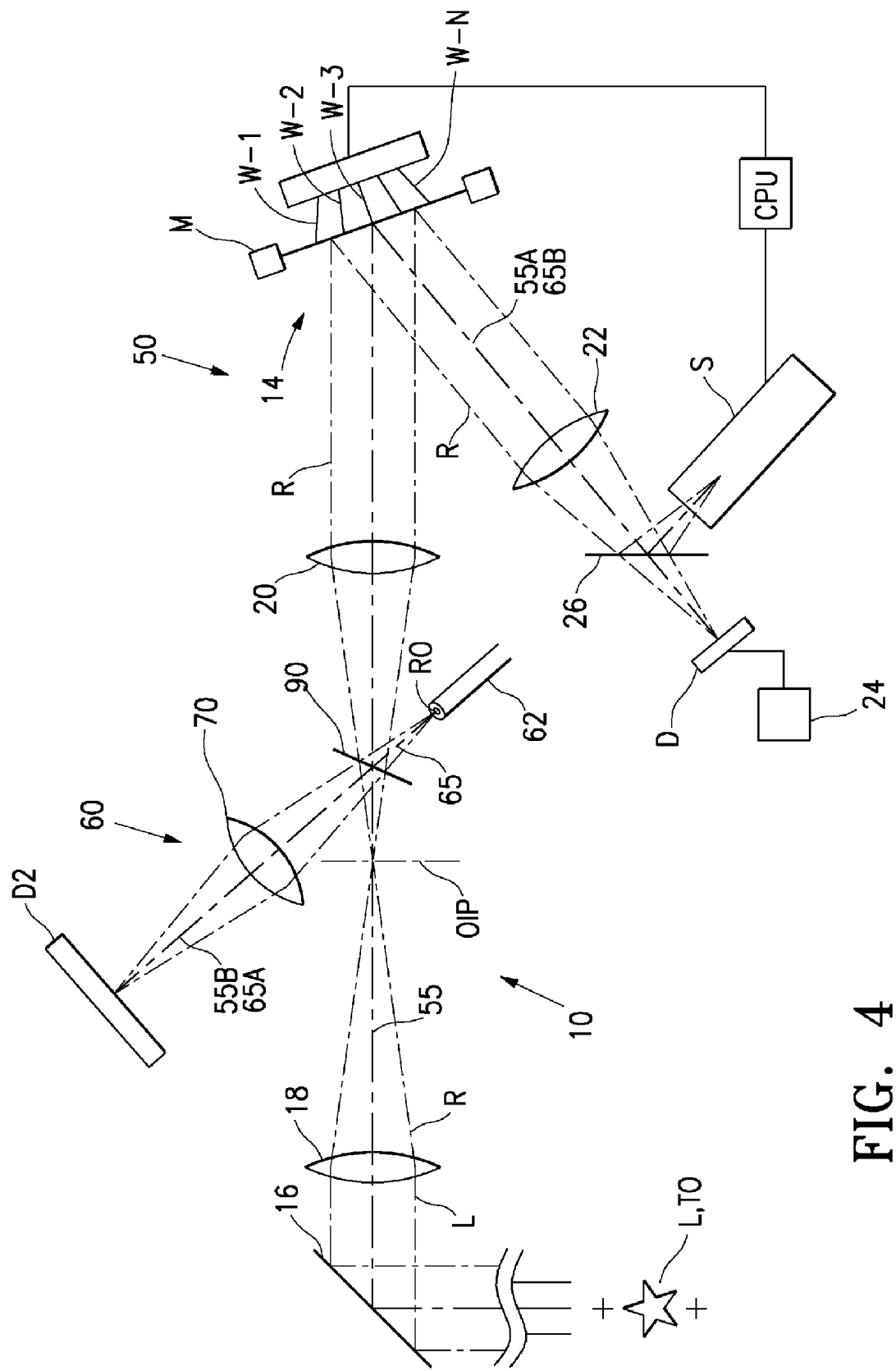
FIG. 4 is an illustration of another adaptive optics imaging system according to the present invention.

The design of the primary imaging subsystem 150 and acquisition imaging subsystem 160 can also take many different forms. FIG. 4 is an illustration of an example implementation. In this example, the variable phase device 114 is implemented as a deformable mirror 14, the detector D has a single detector element (i.e., it is not an imaging array), and the beam steering mechanism 116 is a tip-tilt mirror 16. The telescope 10 has an intermediate image plane OIP, and the reference object RO is a "virtual conjugate" of the image plane OIP. The reference object RO is implemented as the end of an optical fiber, a single mode fiber in this case. Two sources of different wavelengths, one at the wavelength of the wavefront sensor S and one at the wavelength of the acquisition detector D2, are fed into the fiber so that the reference object RO contains two wavelengths. The acquisition detector D2 is an imaging array, a CCD camera in this case.

Referring now to FIG. 4, a simplified form of a primary imaging subsystem 50 is illustrated including a telescope 10 with an adaptive optics system. Light rays R from light source L, such as the illustrated star when the telescope 10 is used for observing stars and planets, enters the primary imaging subsystem 50 via the tip-tilt mirror 16.

Figure 5:
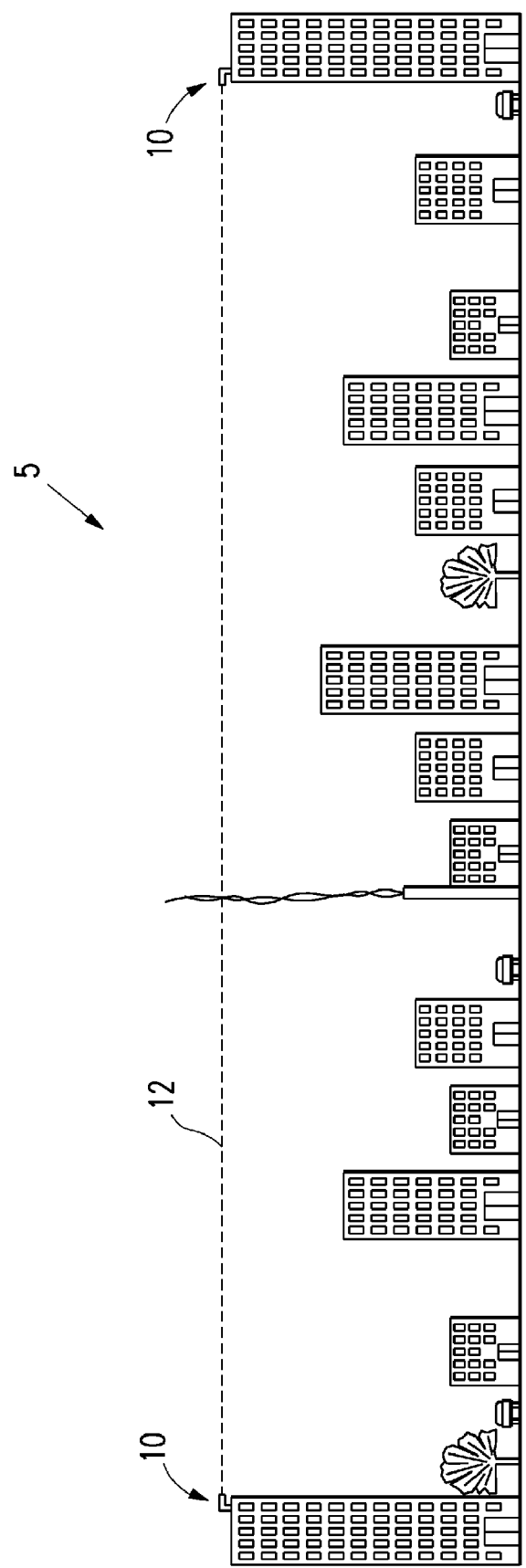
FIG. 5 is an illustration of a free-space optical data transmission system using adaptive optics.

In one embodiment, the light source L is a transmitter for a free-space optical data transmission system (e.g., see FIG. 5). In this embodiment, the telescope is intended to be positioned vertically and the tip-tilt mirror 16 is capable of being pivoted about two perpendicular axes, one on the vertical axis of the telescope like a turret and the other horizontal in the plane of the mirror, to cause "tip" and "tilt" adjustments for aiming the mirror directly along the line-of-sight. As an alternative, the telescope 10 may be rotatable on its axis coincident with a vertical axis for generally aiming the mirror 16 along the line-of-sight, whereby the vertical axis of pivoting of mirror 16 may be eliminated. Still other alternative arrangements may be used for the coarse pointing or aiming of the telescope, such as using other tip-tilt mirrors or translating the objective lens by small amounts.

Returning to FIG. 4, from the tip-tilt mirror 16, the light rays R travel through a lens 18 that focuses the light rays on an object image plane OIP where the image of the light source L exists in focus but is uncorrected. The telescope 10 also may be of a type and construction for receiving light waves from an earth-bound data transmission station L, such as in a system for transmitting data from building-to-building, tower-to-tower, mountain-to-mountain or from ground to space.

The light rays R then pass through a collimating lens 20 to the deformable mirror 14. Thus, in FIG. 4, the light rays R reaching the telescope 10 from light source L would be undistorted and theoretically could produce a diffraction limited image of the source. However, the earth's atmosphere creates aberrations in the light rays R before reaching the telescope 10, which aberrations vary with the atmospheric conditions and over time, even when the telescope is located at high elevations. Similarly, if the telescope 10 is used for viewing something on earth at a distance or for receiving light waves for data transmission from a station at a distance on earth, the earth's atmosphere will create aberrations in the light rays R and, therefore, produce a wavefront that can not produce a diffraction limited image and is constantly changing when it reaches the telescope 10.

Various wavefront sensors have been used to detect the variations in the wavefront caused by the atmospheric aberrations and then to compensate or correct for those aberrations by adaptive optics, such as by using a deformable mirror controlled by a wavefront sensor. Various types of deformable mirrors may also be used. Some types of wavefront sensor and deformable curvature mirror that are particularly suited for use with each other in this type of system are described and shown in U.S. Pat. No. 6,452,145, "Method and Apparatus for Wavefront Sensing," issued Sep. 17, 2002, by J. Elon Graves and Malcolm J. Northcott; and U.S. Pat. No. 6,464,364, "Deformable Curvature Mirror," issued Oct. 15, 2002, by J. Elon Graves and Malcolm J. Northcott. All of the foregoing are incorporated herein by this reference. The deformable curvature mirror 14 in this embodiment is based on applying different voltages across different areas of a piezoelectric material, thus causing deformation. The wavefront curvature sensor S uses a pair of defocused pupil images.

The light rays R reflect from the surface of the deformable mirror 14 to a lens 22 that refocuses the image on the plane of an image detector D. The lens 18, collimating lens 20, deformable mirror 14, lens 22 and image detector D are all located and centered on the optical axis 55 of the system. The image detector D may be of any convenient type that is suitable for the particular application of the system, such as a conventional detector in a video camera, a custom format of charge couple device (CCD), an array of PIN diodes, an array of optical fibers, photon counting detectors, or the like. The detector D provides images and/or data relative to the light intensity throughout the image focused on detector D and these images and/or data are displayed and/or recorded on an appropriate device 24 suitable for this application of the system.

When the deformable mirror 14 is not activated and working in closed loop with the wavefront sensor, the image appearing at the image detector D will be the uncorrected image received by telescope 10. When the deformable mirror 14 is appropriately deformed to compensate for the aberrations, the image at detector D will be diffraction limited, i.e. a corrected image. Similarly, if the system is used for data transmission by light waves, the detector D will receive and detect corrected light rays when the deformable mirror 14 is properly deformed to correct for aberrations in the light rays R transmitted to the primary imaging subsystem 50. Still further, when such a subsystem 55 is used for transmitting data by light rays, the wavefront can be sensed and corrected by the deformable mirror 14 and the same mirror shape can be used to pre-correct a data light emitter positioned at the same location as image detector D.

A partial mirror or beamsplitter 26 is positioned on the optical axis 55A between lens 22 and detector D for reflecting a portion of the light rays R to a wavefront sensor S, such as one of the wavefront sensors disclosed in the patents identified above. In a preferred embodiment of the subsystem 50, the wavefront sensor S senses two defocused pupil images (or the shapes and light intensities for some detectors used in a wavefront sensor S) which are communicated to the central processing unit CPU for processing by data reduction software to derive the wavefront curvature and provide data appropriate for the operation of the deformable mirror 14. Specifically, as is well known in the art, the wavefront is derived or recovered by solving the Poisson equation with respect to intensities with the Dirichlet's boundary conditions relative to the shape of the extrafocal images. An iterative data reduction algorithm or other non-linear fitting technique may be employed to compensate for non-linearity in measurements in an open loop system.

The CPU then provides a plurality of separate and controlled high voltage electrical potentials to a plurality of conductive electrode segments on the back of deformable mirror 14 through a like plurality of separate wires W-1, W-2, W-3 through W-N. The deformable mirror 14 is fixedly mounted in a mount M that is appropriately positioned to reflect the optical axis 55A and light rays R from the collimating lens 20 to the detector D. The overall slope of the mirror, i.e. the angle of reflection of the optical axis 55A, can be modified by the application of high voltages applied to selected electrode segments of the deformable mirror 14 through one or more of the wires W-1 through W-N and the curvature of the surface of the deformable mirror 14 may be modified for correcting aberrations by the application of controlled high voltages also through wires W-1 through W-N.

The acquisition imaging subsystem 60 is similar to the one shown in FIG. 1. A single mode fiber 62 is positioned so that its end serves as the reference object RO. A lens 70 images the reference object RO onto the acquisition detector D2, which in this example is a CCD array. The acquisition detector D2 may be of any convenient type that is suitable for the particular application of the system, such as a conventional detector in a video camera, a custom format of charge couple device (CCD), or the like. The detector D2 provides images and/or data relative to the light intensity throughout the image focused on detector D2 and these images and/or data are used to align the target object TO with the reference object RO, as described previously.

A partial mirror or beamsplitter 90 located between the object image plane OIP and the collimating lens 20 is used to combine the primary imaging subsystem 50 and the acquisition imaging subsystem 60. As described previously, the beamsplitter 90 splits each of the optical axes 55 and 65 into two parts A and B. In this example, the beamsplitter 90 is not located at forty-five degrees relative to the optical axes, so the split axes A and B are not perpendicular to each other. In this implementation, the reference object RO is a virtual conjugate of the image plane OIP. Therefore, downstream of the beamsplitter, the split optical axes are collocated with each other. In other words, the optical axes 55A and 65B are identical, as are the optical axes 55B and 65A.

In one embodiment, the CCD detector D2 and wavefront sensor S operate at different wavelengths. The primary imaging subsystem 50 is used to receive data that has been encoded on light in the approximately 1.55 μm wavelength range. The wavefront sensor S operates at the same wavelengths. The CCD array D2 however operates in the near infrared range because CCD technology is better developed at these wavelengths. The reference object RO contains a component at both wavelengths. This is achieved by using two sources, one in the near infrared range and one in the 1.55 μm wavelength range, and coupling both sources into the optical fiber 62. Fiber couplers, dichroic mirrors or other types of optical couplers and combiners can be used for this purpose. Similarly, the target object TO includes the 1.55 μm transmitter (which is the primary object) but also includes additional beacons that operate in the near infrared region. These beacons are shown as crosses in FIG. 4. Wavelength filters can be used in the subsystems 50 and 60 to filter out light at undesirable wavelengths. The beamsplitter 90 may also have different splitting ratios at the two different wavelengths.

The system operates as described in FIGS. 2 and 3. The end goal is to bring the 1.55 μm transmitter into the field of view of the wavefront sensor S so that the adaptive optics can operate in a closed loop fashion. In step 220, the 1.55 μm component of the reference object RO partially reflects off the beamsplitter 90 to the wavefront sensor S. The adaptive optics loop uses this input to align the wavefront sensor field of view with the 1.55 μm component of the reference object RO. In step 230, the near infrared beacons partially reflect off the beamsplitter 90 and are imaged onto the CCD array D2. The near infrared portion of the reference object RO is also imaged onto the CCD array D2. The tip-tilt mirror 16 is adjusted so that the image of the beacons is aligned with the image of the reference object RO.

At this point, the 1.55 μm transmitter is aligned with the near infrared beacons because their relative positions are known. The near infrared beacons are aligned with the near infrared component of the reference object RO by the CCD array D2 in step 230. The near infrared component of the reference object RO is aligned with the 1.55 μm component of the reference object RO because they both come from the end of optical fiber 62. The 1.55 μm component of the reference object RO is aligned with the field of view of the wavefront sensor S by the adaptive optics in step 220. Therefore, the 1.55 μm transmitter is aligned with the field of view of the wavefront sensor S. The reference object RO can be turned off and the adaptive optics can be run in closed loop mode using the 1.55 μm transmitter.

FIG. 4 is simply one example of a system according to the invention. Other implementations will be apparent. For example, there are many different designs for telescope 10 and optical imager 70, including reflective designs. Some examples of other types of designs are described in U.S. patent application Ser. No. 09/892,913, "Atmospheric Optical Data Transmission System," filed Jun. 26, 2001 by J. Elon Graves and Malcolm J. Northcott, which is incorporated herein by this reference.

FIG. 5 is an illustration of a free-space optical data transmission system 5 using an adaptive optics imaging system. The free-space optical data transmission system 5 is diagrammatically illustrated as being used in an urban environment where a pair of transceivers, generally designated 10 and 10', of the system are located on the roofs of two buildings at substantially spaced locations but having a line-of-sight 12 that is not obstructed by any permanent structures. The transceivers 10 and 10' utilize adaptive optics imaging systems of the sort described previously. The systems shown in FIGS. 1-4 have been described in the context of a detector D receiving an optical signal (or image). In other words, FIGS. 1-4 depict receivers. Transmitters based on the same principle can be constructed by replacing the detector D with a transmitter, such as a modulated laser source or a fiber carrying data-encoded light. Using a transmitter as the light source L in FIGS. 1-4 results in a unidirectional free-space optical data transmission system. Two separate unidirectional systems can be combined to create a bi-directional system. More economically, the transmitter and receiver at each location are combined into a single transceiver, for example by providing both a detector D and a transmitter in each adaptive optics imaging system.

Further examples are described in U.S. patent application Ser. No. 09/892,913, "Atmospheric Optical Data Transmission System," filed Jun. 26, 2001 by J. Elon Graves and Malcolm J. Northcott, which is incorporated herein by this reference.

Either or both of the transceivers 10 and 10' may be mounted in a building at a window for protection from weather conditions, as long as means are provided for cleaning and de-moisturizing the window surfaces to thereby allow an unobstructed transmission of light between the transceivers 10 and 10' along the line-of-sight 12. For example, passing a thin wiper blade over the window surface will not interfere with the data transmission and reception. FIG. 5 includes illustrations of buildings of different heights, automobiles, roadways, trees and a smoke stack on one building, which, in addition to weather conditions, create different atmospheric conditions. Rain, fog, smoke and the like lower the intensity of the transmitted light whereas conditions such as sun-induced and structure-created heat waves, air conditioning discharges, heat exchanger discharges, automobile exhaust discharges, etc. create aberrations in the line-of-sight 12 in addition to the normal atmospheric aberrations caused by weather conditions. Of course, even in a rural application of a free-space optical data transmission system, the atmospheric conditions in a line-of-sight 12 between the transceivers 10 and 10' will be influenced by the varying terrain, vegetation and lack of vegetation, as well as the weather conditions, thereby creating variable aberrations along the line-of-sight 12.

The free-space optical data transmission system 5 uses adaptive optics to mitigate these atmospheric conditions that otherwise adversely affect the transmission and reception of data-encoded light waves. By using adaptive optics in the transceivers, more available data-encoded light is available (provided) to the receiving transceiver with a good image quality. Also, by using bi-directional light transmission, the incoming beam wavefront information may be used to pre-correct the transmitted light beam by the adaptive optics of that transceiver because the bi-directional beams are on the same path. The transceivers 10 and 10' may be identical or of different constructions.

FIG. 5 illustrates a single free-space optical data link between transceivers 10 and 10' and, for economic and physical reasons, it is preferred that the link is bi-directional with a single objective lens in each transceiver serving as both the transmitter and the receiver telescope. However, where appropriate, one telescope may be used as only a transmitter and the other telescope as only a receiver, either continually or periodically, in a unidirectional system whereby each telescope will not literally be a "transceiver", i.e. bi-directional, but for convenience the term "transceiver" will be used herein to mean both bi-directional and unidirectional telescope devices of the free-space optical data transmission systems. Even for such a unidirectional system, a counter-directional probe beam will be used for the operation of the wavefront sensor in the transmitter telescope, whereby light is being transmitted in both directions, and that probe beam may be of a different wavelength than the data-encoded light beam. The light beams transmitted in opposite directions are exposed to and sample the same atmospheric conditions, whereby the wavefront data sensed at each transceiver is relevant to the data transmission. Also, it should be noted that the data-encoded light received by each of the transceivers 10 and 10' of this free-space data link may be processed or retransmitted in any convenient and conventional manner, such as, through fiber optics or another free-space data link of this or any other type.

In the free-space optical data transmission system 5, at present it is preferred to use light of 1.55 μm (microns) wavelength for both the data-encoded light transmission and wavefront sensing, as described below, although different wavelengths may be used for data and wavefront sensing, and other wavelengths may be used and even preferred under certain atmospheric conditions. For instance, the 1.31 μm wavelength may perform well with the present system in a single wavelength or in WDM (wave division multiplexing) mode, but may present problems in a WDM mode due to the number of atmospheric (OH) absorption features. Further, the present commercial unavailability of amplifiers for 1.31 μm at a reasonable cost renders that wavelength less attractive.

While the use of a single pair of transceivers 10 and 10' normally will be used for a free-space data link for reasonable distances, i.e. 1 km to 2 km and perhaps beyond, it is also possible for significantly longer distances to use an arrangement of two or more free-space optical data transmission systems operating side-by-side to increase the reliability and, with such an arrangement, it is preferred that the output apertures of the transceivers be placed close together and that the phase of the data signals transmitted be maintained. In the case of using one or more adjacent apertures, the apertures should be close enough together that the images in the receiver telescopes should sufficiently overlay so that significant energy from each telescope can be coupled to a single fiber. Alternatively the links can, for example, be placed far enough apart that there is no interaction between them (separation of a few arc-minutes or greater with the preferred embodiments) so that they can be operated completely independently.

In the case where the transmitter telescopes are placed closely together sufficient attention must be paid to the transmitter telescopes optical coherence to ensure that problems are not encountered due to spatial or temporal interference. Data modulation signals from each of the transmitting telescopes should be in phase. However, it is important that the optical phase from each telescope should either be controlled to much better than a wavelength or be randomized to prevent interference effects at the receiver. The path length can be controlled actively, but requires a wavefront sensor to determine the relative path length delays, or piston errors that occur between the disparate apertures. Interferometric piston sensors are well known in the art and can be based on fringe tracking or a simple two arm interferometer. Optical phase randomization can be achieved using the same laser light, split to feed each telescope (possibly coherently amplified), provided that dissimilar path delays greater than the optical coherence length are introduced in each telescope, and provided such delays are consistent with maintaining a sufficiently consistent data signal phase relationship. Optical phase randomization may also be achieved by using a separate transmitter diode or laser diode for each telescope, which also implies the use of optical-electrical-optical (OEO) conversion or an incoherent optical amplifier (optical transistor) to transfer the signal.

In a similar way, careful attention must be paid to coherence issues if optical signals from several independent receiver telescopes are to be optically combined. The same solutions of controlling the piston errors, or ensuing the signal are incoherently combined can also be applied to the receiver context. Whenever optical beams from separate sources are combined the optical bandwidth of the transmitter sources must be much greater than the bandwidth of the data signal, to prevent unwanted temporal interference from adding excess noise to the combined signal.

Presently, it is contemplated that the most desirable light sources for transmitting the data-encoded light by the system of the present invention is directly from an optical fiber. This may be a laser diode of any type which is bright enough and can be modulated at fiber transmission speeds. If the data signal is electrical, then an electrical-optical (EO) conversion will be made. If the data signal is optical but of a wavelength that is incompatible with the present system, then a wavelength conversion will be made, such as from 1.31 μm wavelength to 1.55 μm wavelength for the present free-space transmission system. The wavelength conversion can be made by optical means (e.g., based on nonlinear optical phenomenon) or by optical-electrical-optical (OEO) means.

The minimum size of the light beam propagated between two systems is set by diffraction. Assuming that the projected beam has a Gaussian profile of standard deviation σ (sigma) and is projected a distance D, then the standard deviation of the projected beam due to diffraction is $D\lambda/\pi\sigma$ where $\lambda$ is the propagation wavelength. A characteristic propagation distance, which depends on σ the width of the projected beam (which will be a fraction of about ⅓ to ¼ of the objective lens diameter), can be defined. At and beyond the characteristic propagation distance, phase information from the projecting/transmitting telescope is converted to amplitude variations at the receiving telescope. The characteristic distance may be defined (somewhat arbitrarily) as the distance where $D\lambda/\pi\sigma=\sigma$, that is where the beam diameter has expanded by a factor of the square root of 2, then $D=\pi\sigma^2/\lambda$. Therefore, for example, with a 12.5 cm diameter telescope lens with a projected σ (sigma) of 4 cm, the characteristic range would be approximately 3 km.

Beyond the characteristic range, the data signal strength will fall as the square of the distance. For ranges less than the characteristic range, there will be increasing propagation of wavefront phase information between the two systems. At some point this propagation of phase information may cause instability in the two opposing adaptive optics systems. However, geometric arguments suggest that instability should not be a serious problem as long as $1 >> \sigma$. For distances significantly less than the characteristic distance, some differential focus between the transmit and receive fibers may be necessary in order to ensure that the aperture of the receiving telescope is not significantly underfilled. Also at these shorter distances pupil illumination may become non-uniform due to Fresnel diffraction, and adjusting the transmit beam focus may also improve the pupil illumination in this case.

Returning to FIG. 5, each transceiver 10 and 10' of the free-space optical data transmission system 5 uses the techniques described in FIGS. 1-4 in order to align the overall system 5. As described previously, many different types of beacons can be used for this purpose. As an example, assume that the beacon for each transceiver 10 and 10' is a separate light source located outside of the telescope. For example, it may be a set of blinking lights located around the aperture of the telescope or even mounted to the building (as opposed to mounted on the telescope itself). Also assume for this example that the system 5 is transmitting data bi-directionally.

The transceivers 10 and 10' then align themselves as follows. In step 220 of FIG. 2, each transceiver 10 and 10' adjusts its internal adaptive optics system to align the field of view of its wavefront sensor S to its internal reference object RO. In step 230, each transceiver 10 and 10' aligns the beacons of the other transceiver to its internal reference object RO. When both transceivers 10 and 10' have completed these steps, they should be well enough aligned to receive the primary light beam (i.e., the light beam for the wavefront sensor) from the other transceiver. The adaptive optics can then run in closed loop mode using the primary light beam, as shown in step 250.

The use of these systems simplifies the initial acquisition process since, in some applications, the telescope and wavefront sensor have a narrow field of view. In one example, the transmitting telescope produces a primary light beam that is only 100 mm in diameter at a distance of 5 km. It is difficult to acquire such a tightly focused beam using a receiving telescope and wavefront sensor S with such a narrow field of view. The transmitting telescope itself would have to be aligned to point at the receiving telescope before the receiving telescope could be aligned. However, in the approach described above, the acquisition imaging subsystem eases this difficulty. The beacons have a much wider divergence than the primary light beam and can easily be pointed at the receiving telescope. For example, their divergence may be so wide that the receiving telescope can always see the beacons and no active alignment of the beacons is required. At the receiving telescope, the acquisition detector D2 has a field of view which is significantly wider than that of the wavefront sensor S. Thus, it is easier to perform the initial acquisition and alignment of the overall system 5.

Although the invention has been described in considerable detail with reference to certain preferred embodiments thereof, other embodiments will be apparent. Therefore, the scope of the appended claims should not be limited to the description of the preferred embodiments contained herein.

What is claimed is:

1. An adaptive optics imaging system with object acquisition capability comprising:
    a primary imaging subsystem comprising:
        a telescope having an optical axis;
        a variable phase device located on the optical axis; and
        a wavefront sensor located on the optical axis downstream of the variable phase device;
    an acquisition imaging subsystem located in a fixed position relative to the primary imaging subsystem, the acquisition imaging subsystem comprising:
        an optical imager having an optical axis;
        a reference object located in an object plane of the optical imager; and
        an acquisition detector located at an image plane of the optical imager;
    a beamsplitter that splits the telescope's optical axis upstream of the variable phase device and also splits the optical imager's optical axis, wherein the wavefront sensor is located at an image plane of the optical imager, the acquisition detector is located at an image plane of the telescope, and a field of view of the acquisition detector is larger than a field of view of the wavefront sensor;
    a first controller that controls the variable phase device to align the reference object and the wavefront sensor; and
    a second controller that controls a beam steering mechanism for the telescope, to align a target object for the telescope and the reference object.

2. The adaptive optics imaging system of claim 1 wherein the variable phase device comprises a deformable mirror.

3. The adaptive optics imaging system of claim 1 wherein the first controller is coupled between the wavefront sensor and the variable phase device and controls the variable phase device responsive to signals from the wavefront sensor.

4. The adaptive optics imaging system of claim 1 wherein the wavefront sensor uses a pair of defocused pupil images.

5. The adaptive optics imaging system of claim 1 wherein the reference object comprises an end of an optical fiber.

6. The adaptive optics imaging system of claim 1 wherein the reference object has an adjustable amplitude.

7. The adaptive optics imaging system of claim 1 wherein the primary imaging subsystem is designed for operation in a first wavelength band, and the acquisition imaging subsystem is designed for operation in a second wavelength band, and the first and second wavelength bands do not overlap.

8. The adaptive optics imaging system of claim 7 wherein the reference object comprises an end of an optical fiber, and light from both wavelength bands exit the end of the optical fiber.

9. The adaptive optics imaging system of claim 7 wherein the target object comprises:
    a primary object in the first wavelength band; and
    a beacon in the second wavelength band, wherein a position of the beacon relative to the primary object is known.

10. The adaptive optics imaging system of claim 7 wherein the beamsplitter has a first splitting ratio at the first wavelength band and a second splitting ratio at the second wavelength band, and the second splitting ratio is not equal to the first splitting ratio.

11. The adaptive optics imaging system of claim 1 wherein the primary imaging subsystem and the acquisition imaging subsystem are both designed for operation at a same wavelength band.

12. The adaptive optics imaging system of claim 1 wherein the acquisition detector comprises an imaging array.

13. The adaptive optics imaging system of claim 1 wherein the second controller is coupled between the acquisition detector and the beam steering mechanism and controls the beam steering mechanism responsive to signals from the acquisition detector.

14. The adaptive optics imaging system of claim 13 wherein the acquisition detector comprises an imaging array.

15. The adaptive optics imaging system of claim 1 wherein the beam steering mechanism comprises either a steering mirror or a mechanical gimbal.

16. The adaptive optics imaging system of claim 1 wherein an angle between the beamsplitter and either optical axis is not forty-five degrees.

17. The adaptive optics imaging system of claim 1 wherein the telescope has an intermediate image plane located upstream of the beamsplitter and the reference object is a virtual conjugate of the intermediate image plane.

18. A free-space optical data transmission system comprising:
    first and second imaging systems spaced from and aimed at each other, wherein at least one of the imaging systems comprises the adaptive optics imaging system of claim 1; and
    a light transmitter operably coupled to the first imaging system for providing data-encoded light to the first imaging system, that directs the data-encoded light to the second imaging system.

19. The free-space optical data transmission system of claim 18 wherein each imaging system comprises the adaptive optics imaging system of claim 1.

20. The free-space optical data transmission system of claim 18 further comprising:
a second light transmitter operably coupled to the second imaging system for providing data-encoded light to the second imaging system, that directs the data-encoded light to the first imaging system.

21. The free-space optical data transmission system of claim 18 wherein the second imaging system comprises the adaptive optics imaging system of claim 1, and the target object comprises the data-encoded light.

22. The free-space optical data transmission system of claim 21 wherein the primary imaging subsystem is designed for operation in a first wavelength band, the data-encoded light lies in the first wavelength band, the acquisition imaging subsystem is designed for operation in a second wavelength band, and the first and second wavelength bands do not overlap.

23. The free-space optical data transmission system of claim 22 wherein the target object further comprises:
a beacon in the second wavelength band, wherein a position of the beacon relative to the data-encoded light is known.

24. The free-space optical data transmission system of claim 18 wherein the target object comprises:
a primary object; and
a beacon, wherein a position of the beacon relative to the primary object is known.

25. The free-space optical data transmission system of claim 24 wherein the beacon varies in intensity over time.

26. The free-space optical data transmission system of claim 24 wherein the beacon is data encoded.

27. A free-space optical data transmission system comprising:
a first and a second imaging system spaced from and aimed at each other, wherein each imaging system comprises the adaptive optics imaging system of claim 1;
a first light transmitter operably coupled to the first imaging system for providing first data-encoded light to the first imaging system, that directs the first data-encoded light to the second imaging system;
a second light transmitter operably coupled to the second imaging system for providing second data-encoded light to the second imaging system, that directs the second data-encoded light to the first imaging system;
wherein, for each imaging system, the target object comprises the data-encoded light from the other imaging system and further comprises a beacon in the second wavelength band, wherein a position of the beacon relative to the data-encoded light is known.

28. A method for acquiring a target object using an adaptive optics imaging system comprising a telescope having an optical axis, and a variable phase device and a wavefront sensor located on the optical axis, the method comprising:
providing a reference object;
imaging the reference object onto an acquisition detector located at an image plane of an optical imager;
splitting the optical axis of the telescope upstream of the variable phase device and splitting an optical axis of the optical imager, wherein the wavefront sensor is located at an image plane of the optical imager and the acquisition detector is located at an image plane of the telescope, and a field of view of the acquisition detector is larger than a field of view of the wavefront sensor;
controlling the variable phase device to align the reference object and the wavefront sensor; and
controlling a beam steering mechanism located in the telescope's optical axis upstream of the beamsplitter, to align a target object for the telescope and the reference object.

29. The method of claim 28 wherein controlling the variable phase device is further responsive to signals from the wavefront sensor.

30. The method of claim 28 wherein the primary imaging subsystem is designed for operation in a first wavelength band, and the acquisition imaging subsystem is designed for operation in a second wavelength band, and the first and second wavelength bands do not overlap.

31. The method of claim 30 wherein providing the reference object comprises providing a reference object in both wavelength bands.

32. The method of claim 28 wherein controlling the beam steering mechanism is further responsive to signals from the acquisition detector.

33. The method of claim 32 wherein the acquisition detector comprises an imaging array.

* * * * *